Patented Jan. 30, 1951

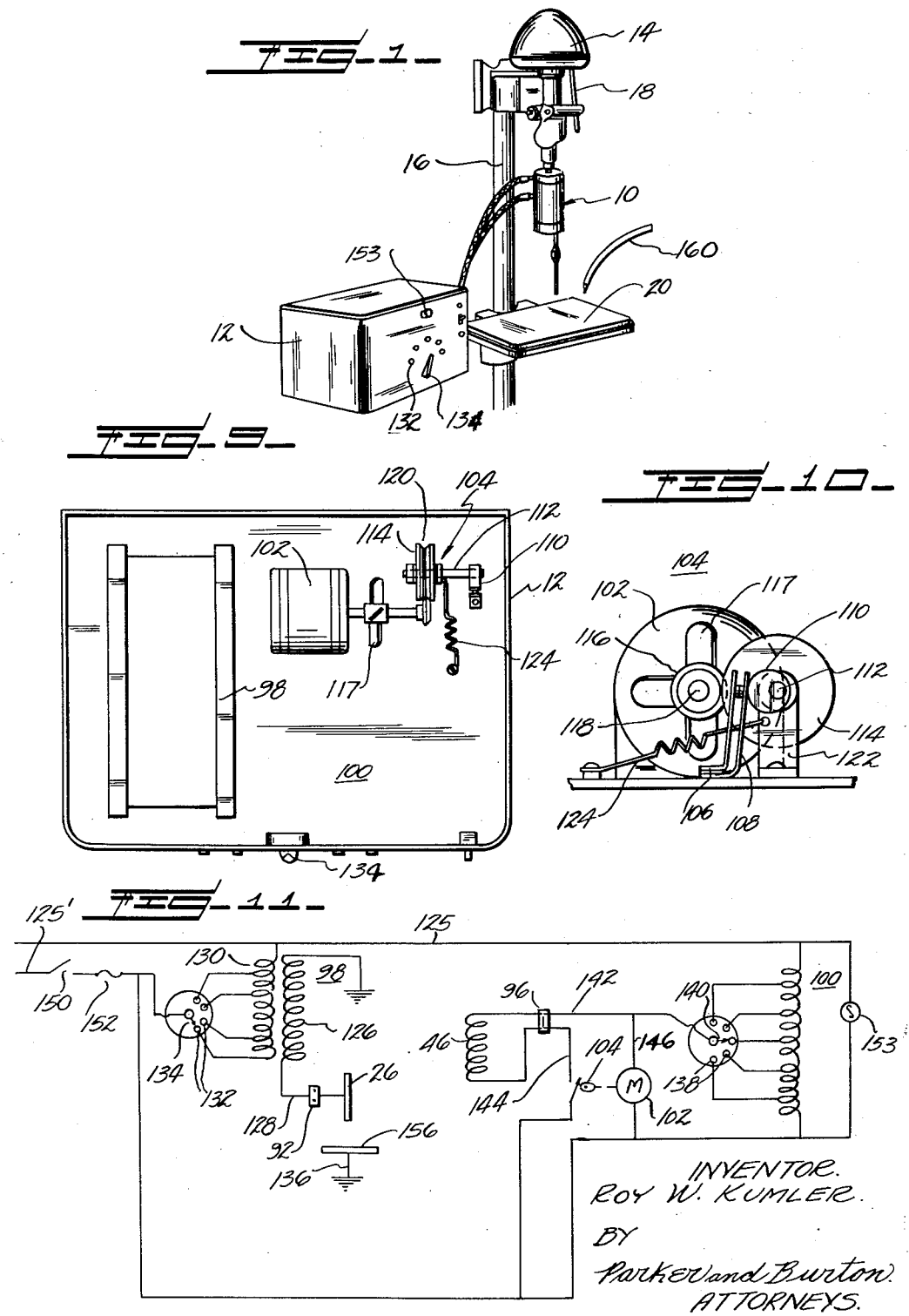

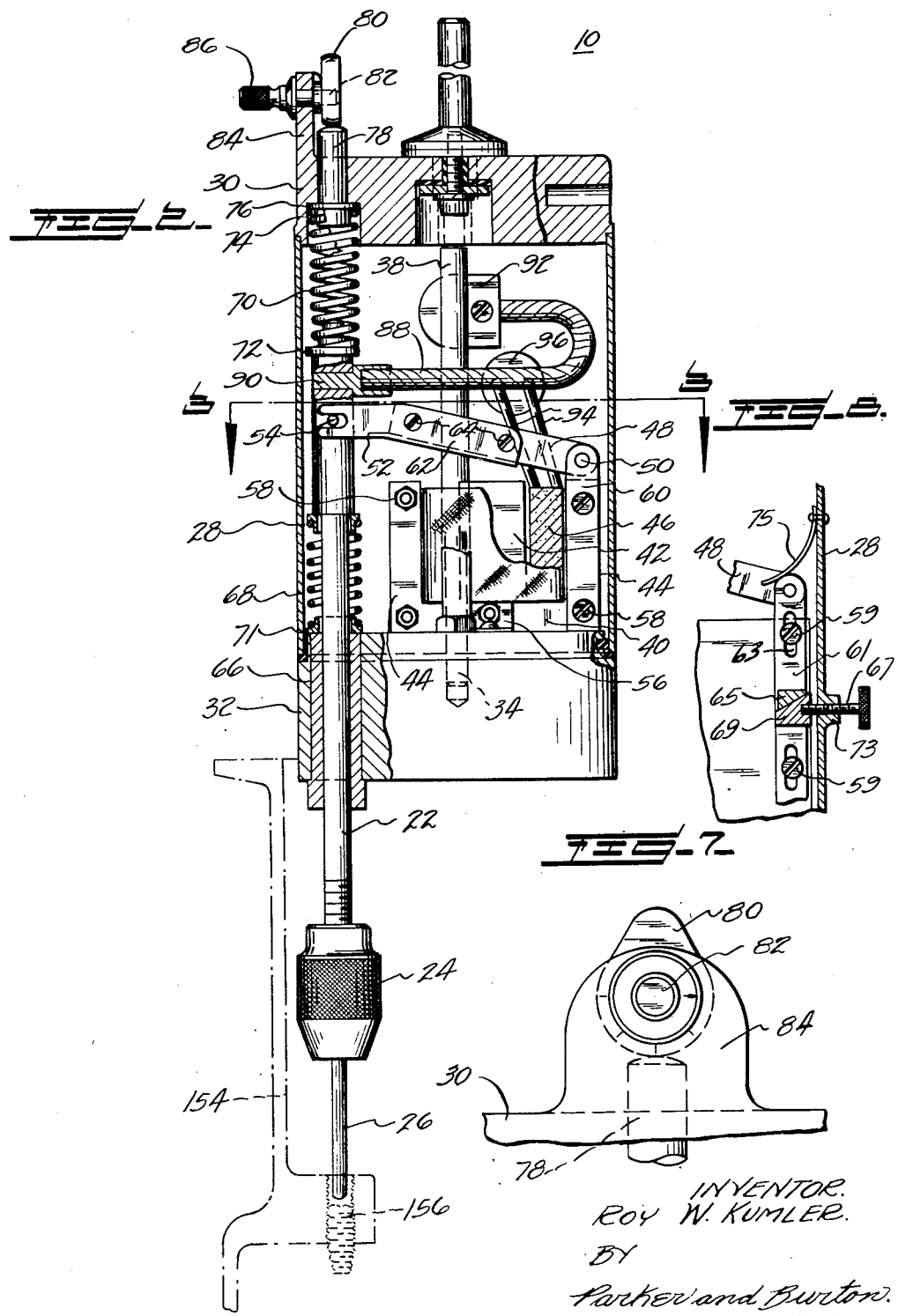

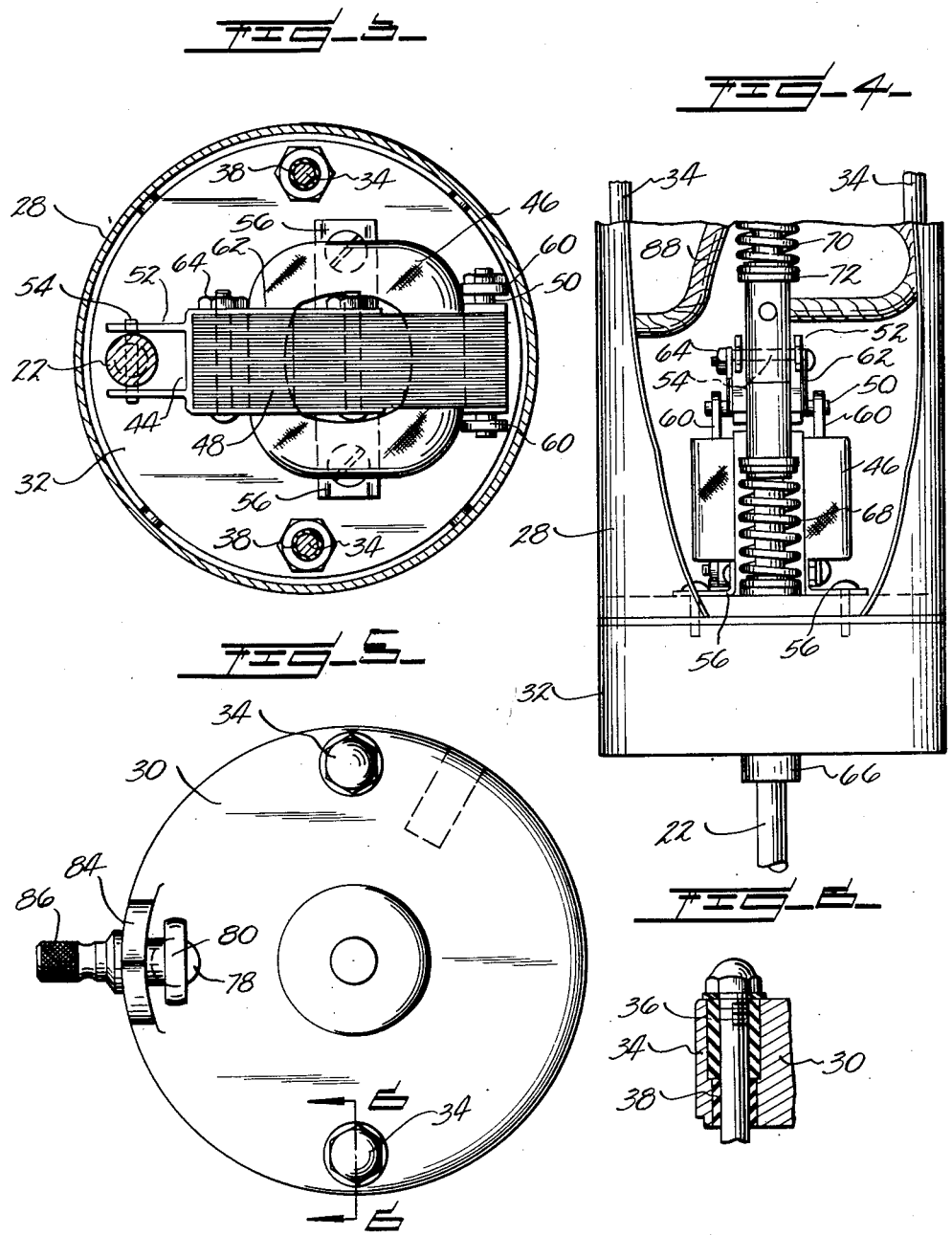

2,539,439

UNITED STATES PATENT OFFICE 2,539,439

METAL DISINTEGRATOR

Roy W. Kumler, Detroit, Mich., assignor, by mesne assignments, to Electro Arc Manufacturing Company, Detroit, Mich., a corporation of Michigan Application March 20, 1946, Serial No. 655,868

19 Claims. (Cl. 219—15)

This invention relates to electrical apparatus for working on metals and particularly to an electro-magnetic device having a vibrating electrode for burning out, disintegrating and removing metallic materials.

Heretofore, devices of this character were limited to relatively short hard strokes of the electrode and where solenoid operating means was employed for providing the stroke movement, the operation was either governed by a rectified alternating current functioning under variable momentum conditions or was dependent entirely upon efficient electrical contact of the electrode with the work piece for excitation of the solenoid. As a result, the vibrating speed of the electrode was very erratic, increasing rapidly as the strokes were shortened and decreasing rapidly as the strokes were lengthened. The speed of the stroke or vibration of the electrode was governed by the variable factors of electrical contact and the degree of inertia or momentum present at the particular length of stroke at which the device was operated. The irregularity of operation quite frequently caused the sticking and fusing of the electrode against the work piece and these occurrences precluded the successful use of solid electrodes. For this reason it was found necessary in most instances to use hollow electrodes and hollow electrode carrying members and provide means for flowing a coolant therethrough to keep the contact clean. Moreover, the short hard strokes of the electrode, which increased both in speed and severity the more the work was brought within the stroke range of the electrode, often caused the distortion or bending of the electrode in the cavity in which it was working resulting usually in irreparable damage. This meant longer time and greater care was necessary to perform each disintegrating operation.

An important object of this invention is to provide a novel method of and apparatus for disintegrating materials which considerably reduces the likelihood of bending the electrodes, permits the use of thinner and more improved types of electrodes, and expedites the disintegrating operation. Operating in accordance with the novel method of this invention, the force or impetus of the vibrating electrode is diminished proportionately to the extent that the elecrode is advanced upon the work. The further the vibrating electrode is pressed into engagement with the work the less is the striking force of the electrode while at the same time maintaining proper stroke length. As a result of this novel method there is considerably less danger of distortion or breakage of the electrodes and solid thinner electrodes of better electrical disintegrating characteristics may be used.

Another important object of this invention is to provide an improved device of this character which magnetically reciprocates the electrode continuously whether the electrode is in engagement with the work or not and which provides hard or soft strokes of varying lengths at regular intervals, thereby providing a wide latitude of stroke conditions to properly meet various working conditions. An important feature of this invention is the provision for obtaining a predetermined timing of the electrode stroke and a control of the degree of impact with the work piece. This enables the operator to make adjustments prior to and during the disintegrating operation to accommodate the device to different conditions that may be encountered. Another important feature of the invention is the provision for floatingly supporting the electrode carrying member between two opposed springs and the provision of a novel control means for varying the yielding resistance of one of the springs.

Another object of the invention is to provide a novel electrical disintegrating device of this character having independent circuits for energizing the electromagnet and for supplying the heating current to the electrode. A novel feature is the provision of a specially designed electromagnet having a novel magnetically influenced part or armature which is separated from the balance of the electromagnet by a variable air gap. An important feature of this invention is the provision for operatively connecting the armature to the electrode carrying member in such a manner that after the electrode contacts the work at the end of one of its strokes and is further advanced toward the work, the air-gap is altered to lessen the magnetic influence under which the armature operates. As a result of this novel relation of parts the impact of the electrode is reduced as it is advanced toward the work. A further novel feature of this device is the intermittent energization of the electromagnet at regular intervals regardless of stroke length and the provision of novel means in the magnetic circuit for accomplishing this purpose.

Various other objects, advantages and meritorious features will become more fully apparent from the following specifications, appended claims and accompanying drawings wherein:

Figure 1 is a perspective view in elevation of an electrical disintegrating machine constructed in accordance with this invention and assembled for operation, Figure 2 is a longitudinal vertical sectional view through the electromagnetically operated device of this invention, Figure 3 is a horizontal cross-sectional view along line 3—3 of Figure 2, Figure 4 is a side view of a portion of the device of Figure 2 partly broken away to show the interior construction assembly, Figure 5 is a top view of the assembled apparatus of Figure 2, Figure 6 is a fragmentary sectional view along line 6—6 of Figure 5, Figure 7 is a fragmentary view of a control mechanism for altering the stroke characteristics of the electrode carrying spindle, Figure 8 is a fragmentary sectional view of a modification of the invention showing control means for altering the air-gap between the armature and the current housing of the electromagnet, Figure 9 is a top interior view of the cabinet housing the electrical supply for the device, Figure 10 is an enlarged detail view of an electric make and break switch for interrupting the electromagnet circuit, and Figure 11 is a diagrammatic view of the various circuits of the apparatus.

In the embodiment of the invention illustrated in the drawings, the device proper for burning out or disintegrating the metallic materials is generally indicated at 10 in Figure 1. It is electrically connected to a housing or cabinet 12 where it may be stored in non-use and which contains an electrical supply and control mechanism for operating the device. Depending upon the type of work, the device may be supported in any suitable way. It is shown in Figure 1 suspended from a head 14 which is mounted for vertical movement on an upright standard or support 16. A handle 18 may be provided for controlling the vertical movement of the head and the device attached thereto in the usual manner. A work supporting table 20 may be provided below the device 10 and this likewise may be connected to the standard 16 for adjustable vertical movement.

Referring more particularly to the remaining figures of the drawings, the device 10 comprises a cylindrical casing or housing from the lower end of which projects an electrode carrying member or spindle 22 of electric conductive material. The lower end of the spindle is provided with an adjustable chuck 24 to which an electrode 26 is adapted to be removably connected. The electrode when thus mounted is electrically connected to the spindle and forms an extension thereof. As shown in Figure 2 the spindle 22 extends upwardly through the bottom of the casing close to one side thereof and reaches a level above the middle of the casing. Within the casing and to one side of the spindle is an electromagnetic device which is operatively connected to the spindle and imparts a vibrating or reciprocating movement thereto.

The casing proper is formed of a plurality of members, several of which are electrically insulated one from the other. A thin shell 28 of brass or other suitable metal surrounds the upper end of the spindle 22 and the electromagnetic device. The opposite ends of the shell are closed by relatively thick members 30 and 32 of light metal, such as aluminum. The upper member 30 is directly connected to the shell. The lower member is electrically insulated from the shell in the manner illustrated in Figure 2. Extending longitudinally through the casing from one closure member to the other are two elongated bolts 34—34, the heads of which as shown in Figs. 5 and 6 bear upon the upper surface of the top member 30. The lower ends of the bolts are threadedly received in the bottom member 32 and as is evident the threaded engagement will draw the two end members toward one another on either side of the shell and clamp the three elements tightly together.

That portion of each bolt 34 extending from the head thereof to the upper surface of the bottom member 32 is enclosed within an insulating sheath. As shown in Figure 6, a relatively thick sleeve 36 of insulating material encloses the upper end portion of each bolt within the top closure member 30. A second thinner sleeve 38 of insulating material covers the remaining portion of each bolt to the upper surface of the bottom closure member 32. In this manner the bottom closure member 32 of the casing is electrically insulated from the top closure member 30 and shell 28.

Mounted on the bottom closure member 32 is the electromagnetic device previously referred to. It comprises a laminated core structure having a laminated base portion 40, an upright laminated central portion 42 and two opposite upright laminated side portions 44—44. A coil winding 46 surmounts the base portion and encircles the central portion 42 of the core structure. As shown in Figure 2, the electromagnetic device and the electrode carrying spindle 22 are mounted side-by-side in the casing with the latter extending substantially parallel to the axis of the coil winding 46.

The electromagnet includes a movable part which is operatively connected to the spindle for imparting a vibrating or reciprocating movement thereto. This part is in the form of an armature mounted for movement within the magnetic field of the core structure. It is located on one side of the electromagnetic device and preferably on the side thereof away from or opposite to the electrode carried by the spindle for reasons which will become more apparent hereinafter. The movable part or armature is spaced from the fixed parts of the electromagnet by an air gap which varies as the armature moves in response to the magnetic circuit established in the core structure and coil winding.

Referring specifically to Figures 2 and 3, the movable part or armature of the illustrated embodiment of the invention comprises a laminated member 48 of magnetizable material overlying the upper end of the coil winding and mounted for movement with respect thereto and with the fixed portions of the core structure. One end of the armature 48 is pivotally connected to the core structure about a horizontally extending pin 50 located on the side of the electromagnetic device opposite to the spindle 22. The opposite free end of the armature 48 is provided with a pair of blade-like extensions or tongues 52 which project into operating engagement with the spindle. This is accomplished by providing a laterally projecting pin 54 extending through the body of the spindle on approximately the level of the armature and providing a bifurcated extremity on the outer end of each tongue 52 which partially embraces the projecting portion of the pin 54. It is evident that swinging movement of the armature toward the coil about its pivotal connection will cause the bifurcated end of the tongues 52 to carry the pin 54 therewith and thrust the spindle in the downward direction of its reciprocating movement.

Any suitable means may be employed to support the parts of the electromagnet upon the bottom closure member 32 of the casing. As shown, angle brackets 56 are provided for connecting the opposite sides of the bottom portion 40 of the core structure to the base member 32. The laminations of the core structure may be secured together by rivets or nut and bolt assemblies such as that indicated at 58. The pin 50 forming the pivotal connection for the armature 48 is supported in slightly spaced relation above the outer side portion 44 of the core structure by two parallel post members 60—60 which extend along opposite sides of this portion and are secured thereto by the nut and bolt assemblies 58 previously referred to. The tongue extensions 52 are illustrated in Figures 2, 3 and 4 as having a channel section 62 integral therewith which embraces the armature 48 and is secured thereto by bolt and nut assemblies 64.

The electrode carrying spindle 22 is mounted for reciprocating movement in a bushing 66 fixed in the lower closure member 32. It is floatingly supported between two opposed springs 68 and 70. As shown in Figure 2, the lower spring 68 encircles the spindle and is seated at one end on a collar 71 bearing on the upper end of the bushing 66, and at the other end against a circular shoulder formed on the spindle body. So mounted, the spring 68 yieldingly resists the downward movement of the spindle and lifts the spindle to its initial starting position. The upper spring 70 has one end seated on the upper end of the spindle through the intermediary of a washer 72 and the other end received in a circular depression 74 formed in the closure member 30 and seated upon a collar 76 on the lower end of a stub shaft 78. Acting on the upper end of the spindle in this manner, the coiled spring 70 serves as a yielding bumper to cushion, limit and help overcome the force and momentum of the upward stroke of the spindle.

A novel provision is made for varying the resistance of the bumper spring 70 and thereby altering the stroke characteristics of the spindle. As shown in Figures 2, 5 and 7, the stub shaft 78 projects upon the upper surface of the member 30 and the upper end thereof engages a cam 80. The latter is mounted for adjustable rotation about a horizontal axis. This is accomplished by securing the cam 80 to the end of horizontal shaft 82 journalled in a flange 84 forming an integral part of the body 30. A knurled operating member 86 is provided for rotating the shaft and the journalled bearing of the latter is such that the cam will retain itself in whatever position it is turned by the operating member 86.

The electric heating current supplied to the electrode is preferably entirely independent of the electric current supplied to the electromagnet device. As shown in Figures 2 and 4, a separate flexible cable 88 is connected at one end by terminal 90 to the spindle 22. The opposite end of the cable is supported by plate 92 which forms a socket opening through the shell of the casing for receiving a terminal plug communicating with the source of electric power. The two leads 94—94 inside the casing supply current to the coil 46 of the electromagnet. Each lead is connected to the end of the coil winding. The outer ends of the leads 94—94 like the cable 88, are supported against the inside of the shell by plate 96 which forms a socket opening through the shell to the outside for receiving a terminal plug communicating with the source of electric power.

A cabinet 12 as previously mentioned contains the circuit supply and control mechanism for operating the apparatus. Within this cabinet is the main transformer 98, a tapped auto-transformer or choke coil 100 and an electric motor 102 which drives a rotary make and break switch mechanism indicated generally at 104 in Figure 10. The circuit for the electromagnet passes through the make and break switch mechanism 104 and is periodically interrupted thereby to energize and deenergize the electromagnet at predetermined intervals of time.

The switch mechanism 104 comprises two insulatively mounted flexible blades 106 and 108 of electric conductive material having electric contacts on their adjacent faces adapted to be brought into engagement with one another by a rotary cam 110 mounted on a shaft 112 as shown in Figure 10. Shaft 112 carries a relatively large pulley wheel 114 frictionally driven by a small wheel 116 fixed to the end of shaft 118 of electric motor 102. The pulley is provided with a V-shaped peripherial groove 120 and the periphery of the drive wheel 116 is conically shaped to enter and frictionally engage the side walls of the groove 120 in the manner illustrated in Figures 9 and 10. Two brackets, one of which is indicated at 122 in Figure 10, support the shaft 112 in raised position above the base of the cabinet 12. These brackets are slightly tiltable and are urged by a tensioned spring 124 toward the drive wheel 116 in the manner illustrated in Figure 10. This assures continuous frictional engagement with the pulley and the drive wheel.

The circuits for the apparatus are diagrammatically illustrated in Figure 11. The primary leads of the alternating current supply circuit are indicated at 125 and 125'. The electrode 26 is electrically connected through spindle 22 and the cable 88 to one side of the secondary winding 126 of the main transformer 98 by the lead 128 which is detachably connected to the socket 92 on the side of the casing shell. The opposite side of the secondary 126 is grounded. The primary winding 130 of transformer 98 is across the main source of current supply. It is provided with a plurality of taps 132 shown on the front side of the cabinet in Figs. 1 and 9. A control handle 134 is provided for connecting any one of the taps to one side of the main source of current supply and is shown on the outside of one cabinet in Figs. 1 and 9. As is well understood by those skilled in the art, progressively greater power is delivered to the electrode when the control handle 134 is swung from left to right across the taps. The work to be disintegrated is represented by the element 156 and is grounded as indicated by lead 136. With the control handle 134 positioned opposite any one of the taps the circuit is closed by bringing the electrode into contact with the work.

The circuit for the electromagnet is taken from the auto-transformer or choke coil 100 placed across the main source of current supply. The choke coil is provided with a plurality of taps 138 and a control handle 140 similar to the control handle 134 feeds current through lead 142 to one side of the electromagnet 46. The opposite side of the electromagnet is connected by lead 144 to the opposite side of the main current supply. In leads 142 and 144 a plug is provided for disconnectible connection into the socket 96 in the casing shell previously referred to. In the lead 144 is the rotary make and break switch 104 operated by the motor 102. The latter is in a branch circuit 146 between the lead 142 and the opposite side of the current supply. A main switch 150 and a fuse 152 may be interposed in series in the main circuit. A panel or indicating light 153 is mounted on the front face of the cabinet 12 to show when the device is in operating condition. The novel provision of the auto-transformer enables the operator to vary the timing of the electrode stroke.

In operation, the rotary make and break switch 104 provides an intermittent current supply for the coil winding of the electromagnet and causes intermittent energization thereof. The force of the magnetic impulse resulting from the energization of the coil winding, combined with the weight and momentum of the hinged armature 48, urges or forces the armature downwardly momentarily toward the electromagnet. The downward movement of the armature imparts a downward movement to the spindle 22. This momentarily downward action is yieldingly resisted by the compression spring 68 which, in turn, recoils during the interruption of the current supply and forces the spindle and the armature upwardly to their initial starting position. The intermittent current supply then cuts in again and checks and stops the upward movement of the spindle, assisted by the bumper spring 70, and then again imparts a downward stroke to the armature and the spindle. The stroke action of the spindle is thereby obtained by a combination of the intermittent magnetic force and the compression and the recoiling action of the spring 68. The spindle may be considered as floatingly supported for reciprocable or vibratory movement between two opposed springs and urged in one direction of its reciprocating movement by the intermittently operating electromagnet at predetermined intervals of time. The spindle and electrode continue to reciprocate whether the electrode is in contact with the work or not. The current is continuously fed to the spindle and electrode regardless of the action of the electromagnet but the circuit is only closed when the extremity of the electrode contacts the work at the lower end of its downward stroke.

There is represented in dotted outline in Figure 2 a casting 154 having a broken tap 156 located therein. The electrode is mounted in position to contact the broken tap at approximately the lower end of its stroke. When the spindle and the electrode are moved downwardly by action of the electromagnet, the tip of the electrode contacts the broken tap 156 and the resulting arc burns out a portion of the tap. Repeated contacts of the electrode gradually burns out the tap completely. For most operations, a stroke cycle of 8 to 12 strokes per second using a stroke length of ⅛" to ½" according to diameter of electrode used has been found to be highly desirable as more disintegrating current may be successfully employed with the electrode thereby increasing the disintegration speed. This relatively slow stroke cycle is in direct contrast to much faster stroke cycles of from 17 per second on up to 30 and more which are inherent in other makes of similar machines. The cam 110 of the rotary make and break switch is operated to provide this timing. However, the stroke cycle may be increased or decreased by varying the position of the control 140 of the auto-transformer 100, and the character of the work to be burned out may be such as to make it desirable to increase or decrease the stroke timing.

An important feature of the invention is the provision whereby as the electrode advances upon the work at a greater speed than the work is distintegrated the stroke becomes softer. This, as previously pointed out, reduces the likelihood of distorting, bending or breaking of the electrode in the cavity in which it is working. By virtue of the relation of the electromagnetic device to the spindle the further the work is brought within the range of reciprocable or vibratory movement of the electrode the lesser becomes the driving force imposed upon the spindle.

The hinged or clapper-type armature 48 is disposed on the side of the electromagnet away from the electrode. As the latter is pressed into vibratory movement with the work, the greater is the minimum air gap between the armature and the fixed parts of the electromagnet. By this it is meant that the air gap at the finish of a stroke is greater than if the electrode was completely free to vibrate its normal unopposed stroke. The increase in the minimum air gap correspondingly reduces the magnetic influence of the electrode mounted on the spindle and thereby correspondingly softens the shock of contact between the electrode and the work. The maximum air gap between the armature and the fixed parts of the electromagnet may be varied by altering the tension of the compression spring 70. Thus the maximum air gap is manually controllable by the operator and the minimum air gap is automatically governed by the pressure with which the electrode engages the work.

To provide a direct control over the variation of the air gap between the fixed and movable parts of the electromagnet, the modification illustrated in Figure 8 may be incorporated in the apparatus. In this modification one supporting post for the hinged end of the armature is indicated at 61. A corresponding companion post is located on the other side of the core structure. Instead of being fixed to the electromagnetic assembly as in the previous embodiment of the invention, the posts 61—61 have a permitted vertical movement. Bolts 59 corresponding to bolts 58 in Figure 2 extend through vertically elongated slots 63 in the posts. Secured to one of the posts 61 is a wedge member 65. Journalled on the end of a shaft of an adjustable control member 67 is a cooperating wedging member 69 arranged with its inclined face contactually engaging the inclined face of the wedge 65. The control member is threaded in a boss 73 on the casing shell 28. Threaded advancement of the control member will slide the lower wedge 69 inwardly and raise the upper wedge member 65 and the post to which it is attached. This will raise the pivotal pin 50 and the other post member and also the hinged end of the clapper-type armature. The upward movement of the hinged end of the armature may be yieldingly resisted by a spring such as the flexible blade 75 fixed at one end to the shell and having the other end bearing upon one of the posts as indicated in Figure 8. By virtue of this control, the operator can vary the air gap of the armature and thereby regulate the quality of the stroke of the electrode from a degree of hardness to a degree of softness.

The self-regulated control over the air gap of the armature enables the device to be operated without attention for relatively long periods of time. For example, the device can be set to operate initially at a ⅛" stroke by placing the end of the electrode that distance from the work piece. If the total unopposed length of the stroke is ⅝" the piece will be gradually burned out until that stroke length is reached. It requires from seven to ten minutes to burn out approximately ⅜" of material. The operator is not required to attend the machine during the period and as a result a battery of these devices may be attended to by one operator.

It is desirable to flow coolant into the cavity during the disintegrating operation. This is preferably accomplished by simply flowing the coolant from the nozzle end of a small hose or other fluid discharging device superimposed over the work. The relatively long strokes of the electrode provide a pumping action in the cavity in which the electrode is working constantly circulating the cooling liquid into and out of the cavity. A desirable coolant is water containing a soluble oil. Valve means may be provided for varying the amount of liquid coolant discharged into the cavity.

What I claim is:

1. The method of electrically disintegrating a piece of work which comprises providing an electrode with a definite range of reciprocating movement, bringing the reciprocating electrode at the end of one of its strokes into engagement with a piece of work to be disintegrated, and reducing the impetus with which the electrode engages the work on said stroke the further the work is advanced within the range of the reciprocating movement of the electrode.

2. An electrical disintegrating machine comprising, in combination, an electromagnetic device including a fixed part and a movable part adapted to be magnetically attracted by and moved toward said fixed part when the electromagnetic device is energized, said movable part mounted with respect to the fixed part so as to be normally spaced therefrom by an air gap which decreases as the movable part moves toward the fixed part, a member mounted for reciprocating movement and adapted to carry an electrode for contact with a piece of work to be disintegrated, means operatively connecting said movable part to said member and adapted upon movement of the movable part toward said fixed part to advance the electrode carrying member toward a piece of work, and means for intermittently energizing said electromagnetic device.

3. An electrical disintegrating machine including, in combination, an electrode carrying spindle floatingly supported for reciprocating movement between two opposed springs, an electromagnetic device mounted alongside of said spindle including a coil and a movable laminated armature magnetically associated with the coil, said armature adapted to move toward said coil when the latter is energized, means for intermittently energizing the coil, means extending from said armature to said spindle and adapted upon movement of the former toward the coil to move the spindle in the direction of its reciprocating movement, and means carried by the end of the spindle advanced by the movement of the armature toward the coil for detachably connecting an electrode thereto.

4. An electrical disintegrating machine comprising, in combination, an electromagnetic device including a coil and an armature hingedly mounted adjacent to one end of the coil and normally overlying one end of the coil in spaced relation thereto, a spindle positioned along side of said electromagnetic device parallel to the axis of said coil and floatingly supported for reciprocating movement between two opposed springs, said spindle having a portion extending beyond the end of said coil opposite to that which said armature overlies and provided on the end of this portion with means for removably connecting an electrode thereto, means for intermittently energizing said coil to cause swinging movement of the armature toward and away from the coil, means operatively connecting said armature to said spindle and adapted upon swinging movement of the armature toward the coil to impart a stroke to the spindle in the direction to move said electrode connectible portion thereof away from the coil, and means for continuously supplying said spindle with an electric heating current for delivery to the electrode connected thereto.

5. An electrical device for disintegrating metal comprising, in combination, a member having means on one end thereof for removably connecting an electrode thereto, an electromagnet mounted alongside of said member and including a fixed coil winding and a movable armature disposed on the side of the coil winding away from the electrode connectible end of said member and adapted upon energization of the coil winding to move theretoward, means mounting said member for reciprocating movement, means operatively connecting said armature to said member and adapted upon energization of the electromagnet to move the member in the direction of the electrode connectible end thereof, means yieldingly opposing the movement imparted to said member by said armature, means for delivering a heating electric current to said member for transmission to an electrode connected thereto, and separate means for delivering an intermittent electric current to said coil winding to intermittently energize the electromagnet.

6. Metal disintegrating apparatus comprising, in combination, an electromagnet having a fixed coil winding and a hinged clapper-type armature pivoted adjacent to one end of the coil winding and movable with respect thereto for varying the air gap therebetween, a member mounted for reciprocating movement alongside of said electromagnet and extending substantially parallel to the axis of the coil winding, means on the end of said member on the side of the coil winding opposite to said armature for removably attaching an electrode thereto and forming an extension of the member for engagement with work to be disintegrated, means for intermittently energizing said coil winding to cause intermittent movement of the armature, means operatively connecting said armature to said member and adapted upon movement of the armature toward the coil winding to move the member in the direction of the electrode attaching end thereof, means yieldingly resisting said movement of said member and returning the member to its initial operating position during the intervals when the coil winding is de-energized, and means supplying an electric heating current to said member for delivery to an electrode attached thereto.

7. The apparatus described in claim 6 characterized by the provision of control means for varying the position of the pivotal connection of the clapper-type armature with respect to the coil winding to vary the air gap therebetween.

8. Metal disintegrating apparatus comprising in combination, an electromagnet having a hinged clapper-type armature, a member extending alongside of said armature having means on one end thereof for detachably connecting an electrode thereto, means mounting said member for reciprocating movement, spring means yieldingly urging said member in one direction of its reciprocating movement, means operatively connecting said armature to said member and adapted upon energization of the electromagnet to move the member in the opposite direction of its reciprocating movement against the resistance of said spring means, an electric circuit for energizing said electromagnet, means in said circuit for periodically interrupting the flow of current to said electromagnet to cause intermittent energization thereof, and a second electric circuit for continuously supplying electric heating current to said member for delivery to an electrode attached to said end thereof.

9. In the operation of metal disintegrators having a vibratory electrode adapted to reciprocate into and out of engagement with the piece of work and gradually burn a hole therethrough, the method which comprises applying a magnetic force to move the electrode in its stroke toward the work piece which progressively increases in strength as the electrode approaches the end of said stroke.

10. In the operation of metal disintegrators having a vibratory electrode adapted to reciprocate into and out of engagement with a piece of work and gradually burn a hole therethrough, the method which comprises reciprocating an electrode between two opposing forces, one of said forces being a magnetic field arranged to exert its force in a direction to move the electrode toward and into engagement with the work piece, and progressively increasing the force exerted by the magnetic field as the electrode approaches the work piece.

11. An electrical disintegrating machine comprising, in combination, an electromagnetic device including a coil and an armature hingedly mounted adjacent to one end of the coil and normally overlying said end of the coil in spaced relation thereto, a spindle positioned alongside of said electromagnetic device parallel to the axis of said coil and mounted for reciprocating movement, opposed springs floatingly supporting said spindle intermediate the extreme positions of its reciprocating movement, said spindle having the end thereof on the side of the coil opposite to said armature provided with means for detachably connecting an electrode thereto, means for intermittently energizing said coil to cause swinging movement of said armature toward and away from the coil, means operatively connecting said armature to said spindle and adapted upon swinging movement of the same toward the coil to impart a stroke to the spindle in the direction to move the electrode connectible end thereof away from the coil, means for continuously supplying said spindle with an electric heating current for delivery to an electrode connected thereto, and means for varying the resistance of one of said opposed springs.

12. In an electrical disintegrating machine, a housing body, means mounting the body and guiding the same for movement in a linear path toward a piece of work in which a hole is to be burned out, an electrode carrying member, means mounting said member in the body for reciprocating movement relative thereto and parallel to the direction of the linear movement of the body, an electromagnetic device in the body including a fixed part and a movable part, said movable part being disposed offset to the center of the magnetic field of the electromagnetic device and adapted when the device is energized to be magnetically attracted by and moved toward the center of the magnetic field, means connecting said movable part to said member so as to cause movement of the member toward a piece of work to be burned out when the movable part is attracted by and moves in the direction of the center of the magnetic field, means for intermittently operating said electromagnetic device, means yieldingly opposing the movement of the member in the direction of the work piece and functioning to move the same away from the work piece during the interval of time when the electromagnetic device is inoperable, and means for supplying a steady electric current to the member for use by the electrode carried thereby.

13. An electrical disintegrating machine including, in combination, an electrode carrying spindle mounted for reciprocating movement, an electromagnetic device mounted alongside of said spindle including a coil and a movable armature magnetically associated with the coil and responsive to the energization thereof to move toward the coil, means for intermittently energizing the coil, means extending from said armature to said spindle, and adapted upon movement of the armature toward the coil to move the spindle in one direction of its reciprocating movement, a spring yieldingly opposing the movement imparted to said spindle by said armature, a buffer spring yieldingly resisting the return movement of the spindle, and means for varying the tension of said buffer spring.

14. In an electrical disintegrating machine, a housing body, means mounting the body and guiding the same for movement in a vertical path downwardly toward a piece of work in which a hole is to be burned out, a vertical member of electrical conductive material having means on the lower end for removably connecting an electrode thereto, means mounting the upper end of the member in the body for vertical reciprocating movement relative thereto and with the electrode connectible end of the member in projecting relation below the body, an electromagnetic device in the body including a fixed coil winding and a movable armature, said armature being disposed offset to the center of the magnetic field created by the coil winding and on the upper side thereof and adapted when the coil winding is energized to move downwardly toward the center of the magnetic field, means connecting the armature to the member so as to cause downward movement of the member toward and into engagement with the work piece when the armature is attracted by and moves in the direction of the center of the magnetic field, means for intermittently passing an operating current through the coil winding, means yieldingly opposing the downward movement of the member and adapted to raise the member during the intervals of time when the coil winding is inoperable, said yielding means opposing the downward movement of the member with increasing strength the further the member advances toward the work, and means for supplying a steady alternating current to the member for use by the electrode connected thereto.

15. An electrical device for disintegrating metal comprising, in combination, a spindle having means on one end thereof for removably connecting an electrode thereto, an electromagnet mounted alongside of said spindle and including a fixed coil winding having its axis extending substantially parallel to that of the spindle and a movable armature, means mounting the armature with respect to the coil winding such that when the latter is actuated the armature moves in the direction of the electrode connectible end of the spindle, means mounting said spindle for reciprocating movement, means operatively connecting said armature to said spindle and adapted upon actuation of the electromagnet to move the spindle in the direction of its electrode connectible end, means yieldingly opposing the movement imparted to said spindle by the armature, means for delivering a heating electric current to said spindle for transmission to an electrode connected thereto, and means for delivering a variable electric current to said coil winding to intermittently actuate the electromagnet.

16. In a metal disintegrating machine, a frame, a projecting spindle mounted for reciprocating movement in said frame and adapted to hold an electrode on the projecting end thereof, resilient means mounted in said frame and operative to urge said spindle towards the frame, an electromagnetic means including a fixed coil and a movable armature, means mounting said electromagnetic means in the frame alongside of said spindle with the axis of the coil extending substantially parallel to that of the spindle, means connecting said armature to said spindle and adapted upon actuation of the electromagnetic means to move the spindle outwardly of the frame against the resistance of said resilient means, and means for rendering said electromagnetic means alternately operable an inoperable to cause the spindle to reciprocate.

17. In the operation of a metal disintegrator having an electrode adapted to reciprocate into and out of engagement with a piece of work and gradually burn a hole therethrough, the method which comprises exerting a progressively increasing magnetic force on the electrode for moving the electrode in its stroke toward the work piece, and exerting a progressively increasing force on the electrode opposing the movement of the electrode toward the work piece.

18. In the operation of a metal disintegrator having a vibratory electrode adapted to reciprocate into and out of engagement with a piece of work and gradually burn a hole therethrough, the method which comprises reciprocating the electrode between two opposing forces, one of said forces being a magnetic field arranged to exert its force in the direction to move the electrode toward and into engagement with the work piece, progressively increasing the force exerted by the magnetic field as the electrode approaches the work piece, and progressively increasing the force on the electrode opposing said magnetic force as the electrode approaches the work piece.

19. An electrical disintegrating machine for burning relatively deep holes in work pieces comprising, in combination, an electromagnetic device including a fixed coil winding and a movable armature, said armature being normally disposed offset to the center of the magnetic field created by the coil winding and adapted to be magnetically attracted by and moved toward the center of the magnetic field when the coil winding is rendered operable, a member adapted to carry an electrode on one end thereof, means mounting said member for reciprocating movement and with the electrode end thereof on the side of the center of the magnetic field opposite to that on which the armature is disposed, means connecting said armature to the member and adapted upon movement thereof toward the center of the magnetic field to advance the electrode end of the member toward and into engagement with a work piece, means for supplying an intermittent operating current to the coil winding, means yieldingly opposing the movement of the member in the direction urged by the armature and adapted to return the member during the intervals of time when the coil winding is inoperable, and means for supplying a steady current to the member for delivery to the electrode carried thereby.

ROY W. KUMLER.

REFERENCES CITED

The following references are of record in the file of this patent:

UNITED STATES PATENTS

| Number | Name | Date |
| --- | --- | --- |
| 1,984,809 | Requa | Dec. 18, 1934 |
| 2,079,310 | Bennett | May 4, 1937 |
| 2,383,382 | Harding | Aug. 21, 1945 |